United States Patent [19]
Ford

[11] 3,911,554
[45] Oct. 14, 1975

[54] METHOD OF BENDING A LAMINATED BUILDING PANEL AND A CORNER PRODUCED THEREBY

[75] Inventor: Joseph E. Ford, Connersville, Ind.

[73] Assignee: H. H. Robertson Company, Pittsburgh, Pa.

[22] Filed: Dec. 2, 1974

[21] Appl. No.: 528,723

[52] U.S. Cl. .............. 29/527.2; 249/201; 52/631; 29/DIG. 3; 29/DIG. 23; 113/116 A; 72/379; 228/142

[51] Int. Cl.² ....................... B23K 31/02

[58] Field of Search ......... 29/527.2, DIG. 3, 14, 33, 29/155, 445, 476; 52/631, 658; 249/197–201; 113/116 A; 72/46, 177, 379, 702

[56] References Cited
UNITED STATES PATENTS

| | | | |
|---|---|---|---|
| 944,536 | 12/1909 | Bonfield et al. | 29/DIG. 33 |
| 1,671,084 | 5/1928 | Meyercord | 52/631 |
| 2,069,668 | 2/1937 | Flint | 52/631 |
| 2,728,479 | 12/1955 | Wheeler | 52/631 |
| 2,776,231 | 1/1957 | Brown | 52/631 |
| 3,649,398 | 3/1972 | Keith | 52/631 |
| 3,671,369 | 6/1972 | Kvalheim et al. | 52/631 |

Primary Examiner—C. W. Lanham
Assistant Examiner—V. K. Rising
Attorney, Agent, or Firm—Harry B. Keck; George E. Manias

[57] ABSTRACT

A method of bending a building panel along a selected line extending transversely or longitudinally of the panel, to provide a corner having a smooth bending edge. In accordance with the present method, a backing is applied to the hidden face of a facing sheet. The backing is notched to provide a V-notch extending parallel with the selected line and having an apex proximate to the hidden face. The facing sheet is indented along the selected line to produce a groove in the exposed face and a complementing bead in the hidden face. The panel is then shaped into sections having a common bending edge coincident with the selected line and such that the inside of the bending edge is formed from the bead and the outside of the bending edge is formed from the groove. The groove which is visible prior to bending the panel is substantially imperceptible visually as a concavity after bending the panel.

11 Claims, 14 Drawing Figures

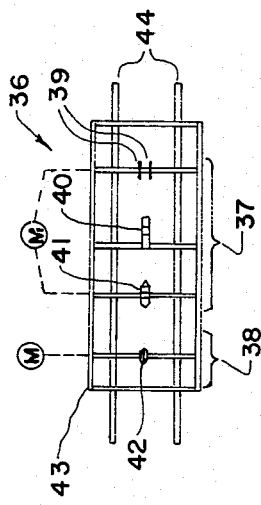
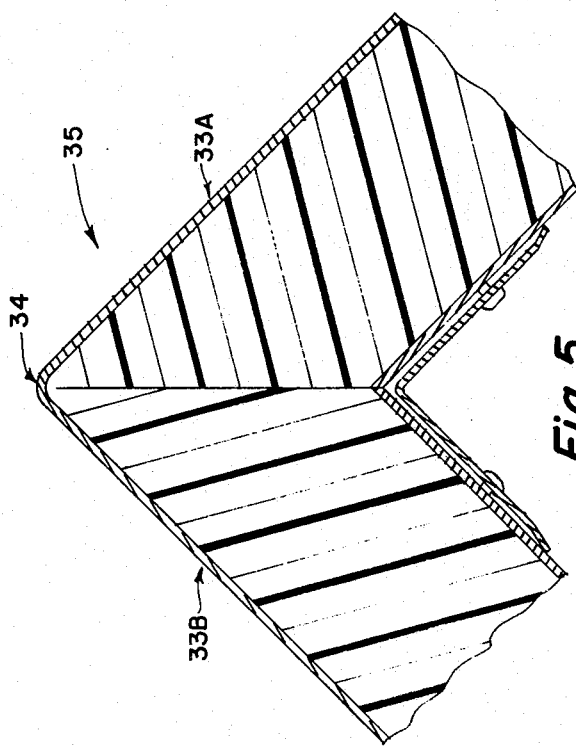
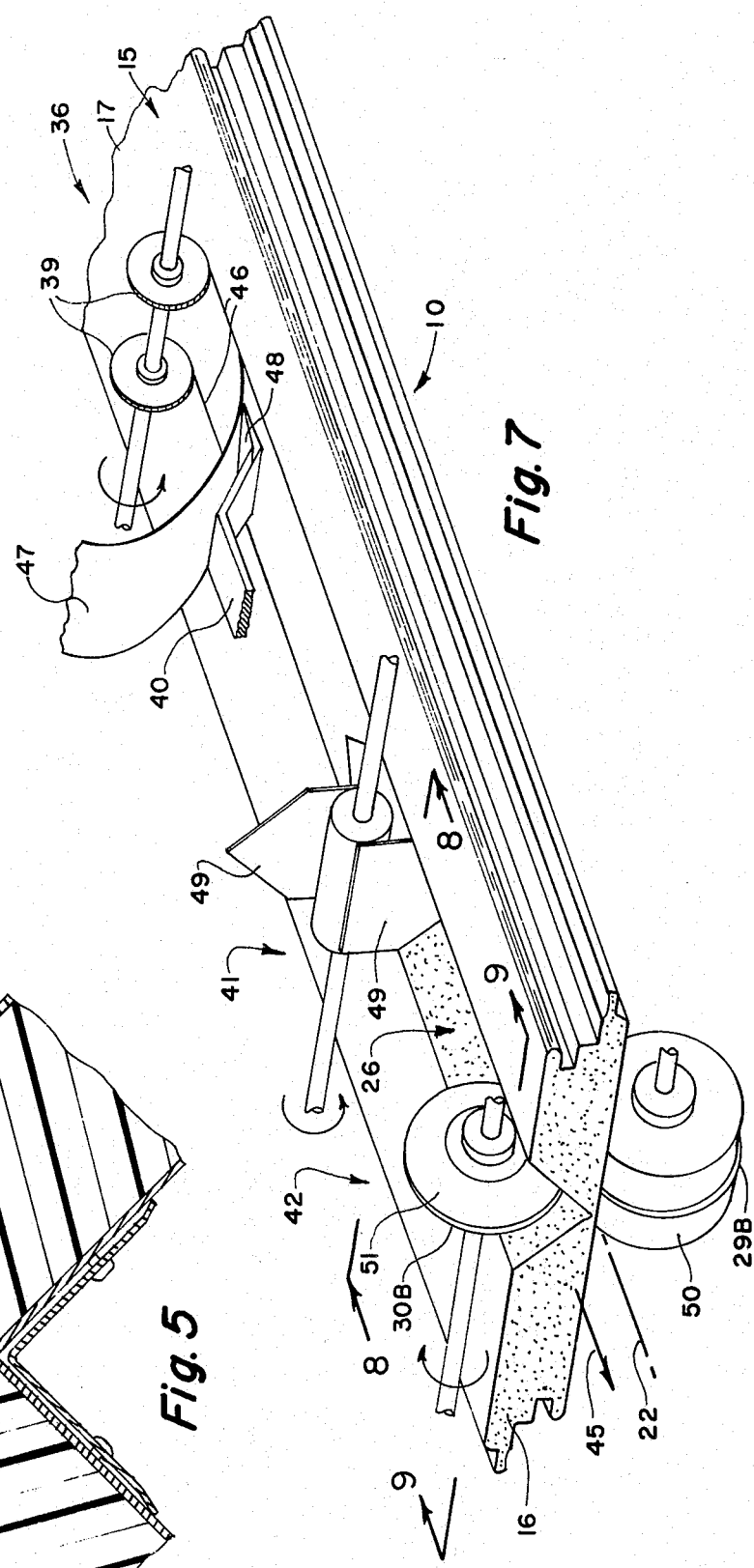

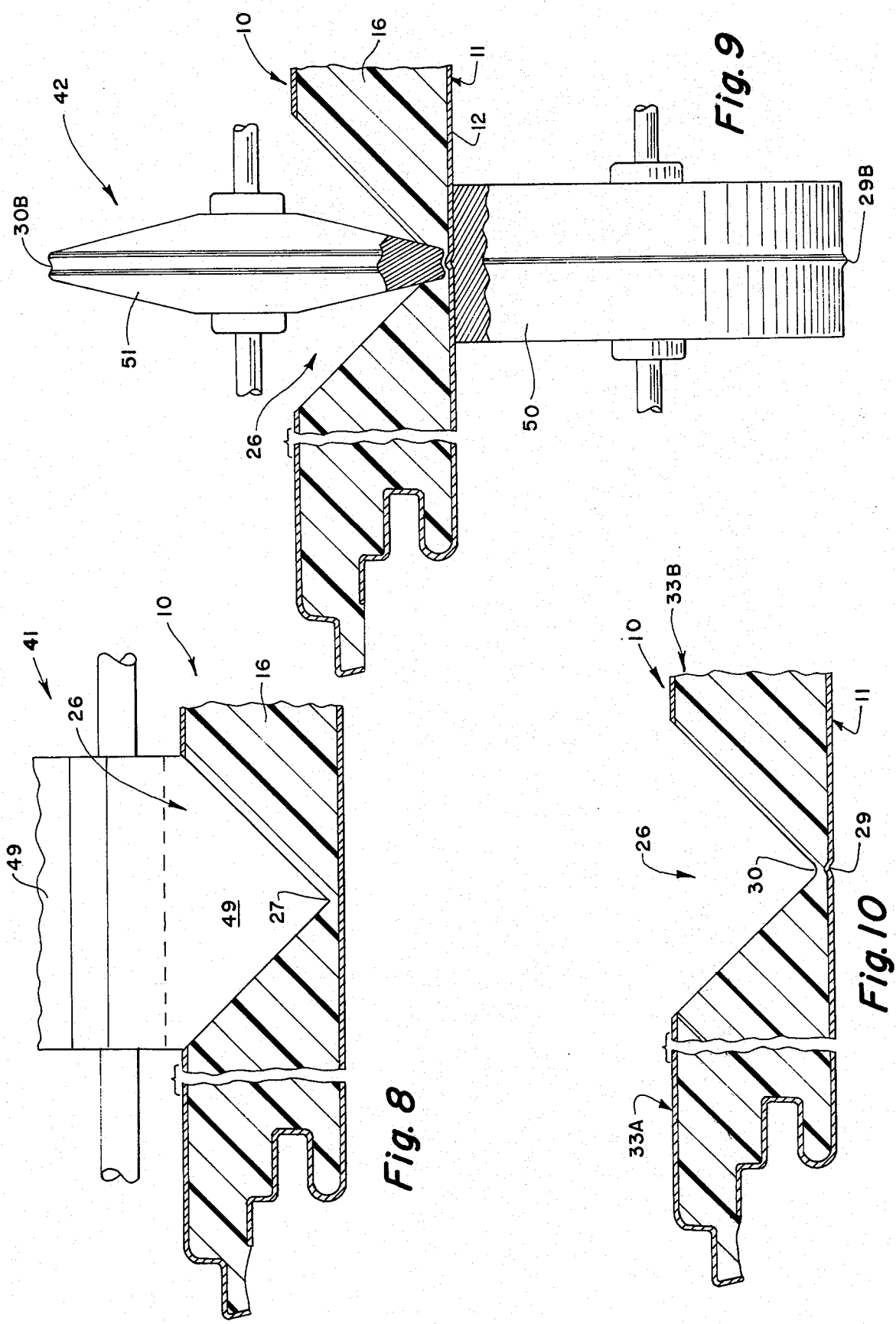

METHOD OF BENDING A LAMINATED BUILDING PANEL AND A CORNER PRODUCED THEREBY

BACKGROUND OF THE INVENTION

1. Field of the Invention

This invention relates to a method of bending a building panel and to corners produced thereby.

2. Description of the Prior Art

Numerous methods for bending a metal sheet along a selected line are known in the art. Metal sheets have been bent by hand over mandrils or by power actuated break forming apparatus.

It is also known to cold-work strain-harden a metal sheet by imparting to the metal sheet a ridge-and-groove or undulatory profile. In addition to increasing the strength of the metal sheet, and added advantage is that the sheet may be bent into sections having a common bending edge such that the outside of the edge is formed by a ridge and the inside of the bending edge is formed by a complementing groove. See U.S. Pat. No. 3,165,815 (A. WOGERBAUER, Jan. 19, 1965). Metal sheets having an undulatory profile are not architecturally acceptable for use as facing sheets in wall constructions.

Wall panels formed from a pair of facing sheets and an intermediate core are used extensively in the construction of various types of enclosures. A prevalent trend in present day panel design is the bending of the panels to produce corner constructions of desired architectural appearance. Numerous methods have been proposed for bending such panels. See, for example, U.S. patents issued to G. G. Meyercord, U.S. Pat. No. 1,440,615 (Jan. 2, 1923); U.S. Pat. No. 1,549,205 (Aug. 11, 1925); U.S. Pat. No. 1,671,084 (May 22, 1928); and the U.S. patent issued to M. E. Nerem, U.S. Pat. No. 3,496,689 (Feb. 24, 1970). Basically, these methods consist of notching the panel to remove a segment of the inner facing sheet and the core and thus provide a V-shaped groove having an apex adjacent to the exterior facing sheet. The exterior facing sheet is then bent along the base of the groove to move the exposed core surfaces and inner facing sheet edges into juxtaposition. At the bend line, the exterior facing sheet undergoes a stretch bend.

SUMMARY OF THE INVENTION

The principal object of this invention is to provide a method for bending a building panel along a selected line and an improved corner configuration produced thereby.

Another object of this invention is to provide a method for bending a building panel by which the building panel is shipped to the job site in a flat condition and is bent, by hand, at the job site.

The present method constitutes an improvement over that method disclosed and claimed in copending application Ser. No. 388,955 filed Aug. 16, 1973, now U.S. Pat. No. 3,881,338, which is a division of now abandoned application Ser. No. 149,245 filed June 2, 1971, both assigned to the assignees of the present invention.

The present method may be employed to bend panels of a variety of different constructions. Such panels include the two component type formed from a facing sheet and a backing member. The backing member may comprise a self-adhering foamed-in-place plastic composition or a preformed block of foamed plastic composition secured to the facing sheet by a film of adhesive. Such panels also include the three component type formed from a pair of facing sheets having a core material therebetween. The core material may comprise a self-adhering foamed-in-place plastic core or a preformed block of foamed plastic composition secured to the facing sheets by films of adhesive.

In accordance with the present invention, a metal facing sheet is provided having an exposed face and a hidden face. A backing is applied to substantially the entire area of said hidden face. The backing is notched to provide a V-groove extending parallel with the selected line and having an apex proximate to the hidden face of the facing sheet. The facing sheet is indented along the selected line to produce a groove in the exposed face and a complementing bead in the hidden face. The building panel is then bent about the selected line to provide angularly presented panel segments having a common bending edge. The panel is bent such that the inside of the common bending edge is formed from the complementing bead and the outside of the common bending edge is formed from the groove. The groove presented by the metal facing sheet prior to bending is substantially imperceptible visually as a concavity after bending.

The selected line may extend transversely of the panel in which case the panel is positioned between power actuated linear dies having confronting faces configured to provide the required indentation.

The selected line may extend longitudinally of the panel in which case the panel is introduced between forming rolls having peripheral faces configured to provide the required indentation.

BRIEF DESCRIPTION OF THE DRAWINGS

FIG. 5 is a fragmentary cross-sectional view illustrating an outside corner produced from the indented laminated building panel of FIG. 4;

FIG. 6 is a plan view, schematically illustrating apparatus for preparing a panel for bending along a longitudinally extending selected line;

FIG. 7 is a fragmentary isometric view of the apparatus of FIG. 9;

FIG. 8 is a cross-sectional view taken along the line 8—8 of FIG. 7;

FIG. 9 is a cross-sectional view taken along the line 9—9 of FIG. 7;

FIG. 10 is a cross-sectional view similar to FIG. 9, illustrating the panel after the indentation step;

DESCRIPTION OF THE PREFERRED EMBODIMENT(S)

Figure 1:
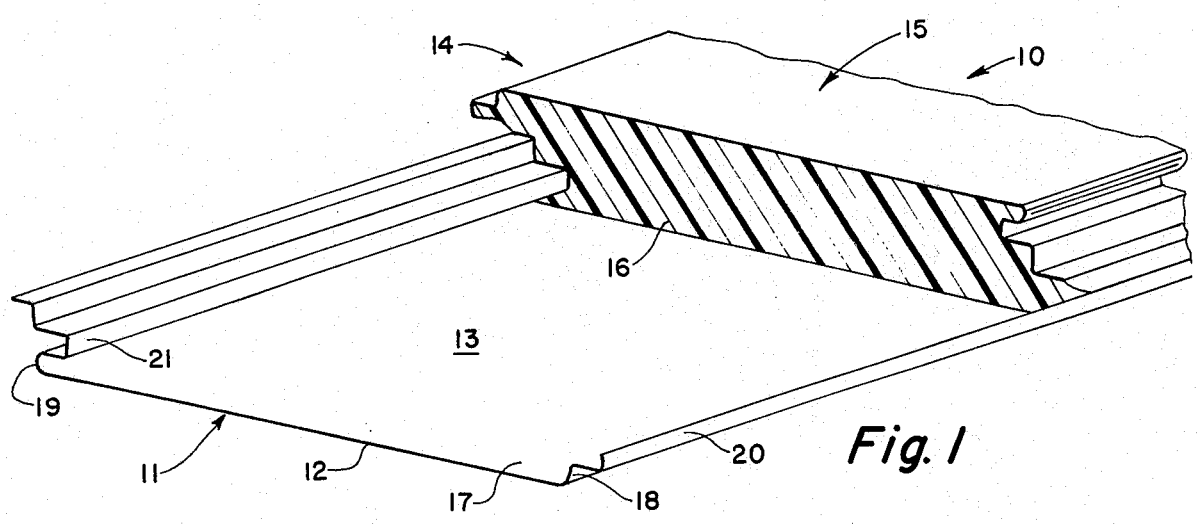
FIG. 1 is an isometric view of a facing sheet with a backing applied to the hidden face thereof.

The present method may be employed to bend laminated building panels, such as the foam core panel 10 of FIG. 1. The panel 10 may comprise that panel described and claimed in U.S. Pat. No. 3,777,430 which is assigned to the assignee of this invention. For a complete description of the panel 10 reference is directed to the aforesaid U.S. Pat. No. 3,777,430.

The panel 10 comprises an outer facing sheet 11 having an exposed face 12 (not visible) and a hidden face 13. A backing 14 is applied to substantially the entire area of the hidden face 13. The backing 14 comprises an inner facing sheet 15 and a foam core 16 filling the space between the facing sheets 11, 15. The outer facing sheet 11 includes a central web 17 having side walls 18, 19 provided along its opposite longitudinal edges. The side walls 18, 19 are provided with complementary mating elements 20, 21 which permit the panels 10 to be erected bu side-by-side inter-connected relation. The inner facing sheet 15 may be identical to the outer facing sheet 11.

Alternatively, the backing 14 may comprise a self-adhering foamed-in-place plastic composition or a preformed block of foamed plastic composition secured to the facing sheet by a film of adhesive. The present method may also be employed to bend panels of other well-known three component types which are formed from a pair of facing sheets having a core of material therebetween. The core material may comprise a self-adhering foamed-in-place plastic core, such as illustrated in FIG. 1, or a preformed block of foamed plastic composition secured to the facing sheets by films of adhesive.

TRANSVERSE BENDS

Figure 2:
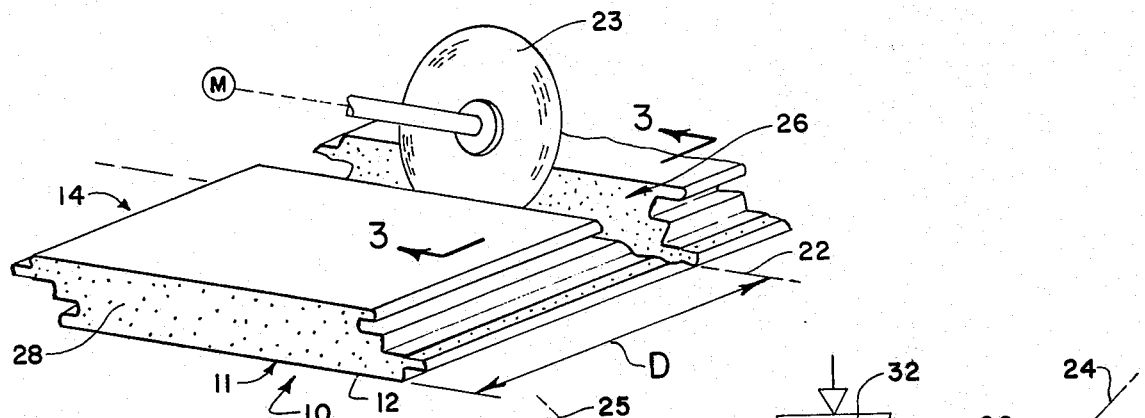
FIG. 2 is an isometric view illustrating a notching step of the present method.

The present method may be employed to prepare a panel for bending about a selected line which extends longitudinally of the panel. After the panel 10 is assembled, the backing 14 is notched along a selected line indicated at 22 in FIG. 2, which extends transversely of the central web 12 of the facing sheet 11. The notching is accomplished, for example, by passing a driven circular saw 23 disposed at the desired inclination relative to the central web 12, through the backing 14 as illustrated in FIG. 2. Two passes of the saw 23, one along each of the intersecting cutting planes 24, 25 (FIG. 3) produces a generally V-notch 26 extending parallel with the selected line 22 (FIG. 2) and which has an apex 27 proximate to the hidden face 13 of the facing sheet 11. Alternatively, two of the saws 23 can be arranged so as to produce the V-notch 26 in one pass.

A suitable jig (not illustrated) may be employed to position each of a plurality of the panels 10 such that the V-notch 26 is accurately cut at a selected distance D (FIG. 2) from one panel end 28. When required, additional longitudinally spaced V-notches 26 also may be accurately cut in each panel at other distances from the panel end 28.

Figure 3:
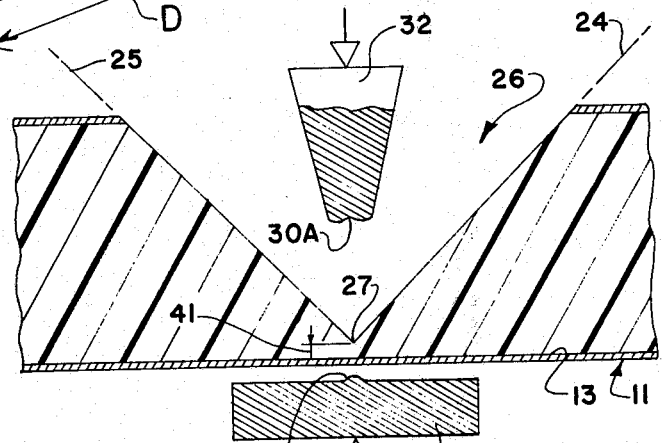
FIG. 3 is a fragmentary cross-sectional view, taken along the line 3—3 of FIG. 2, illustrating an indenting step of the present method.
Figure 4:
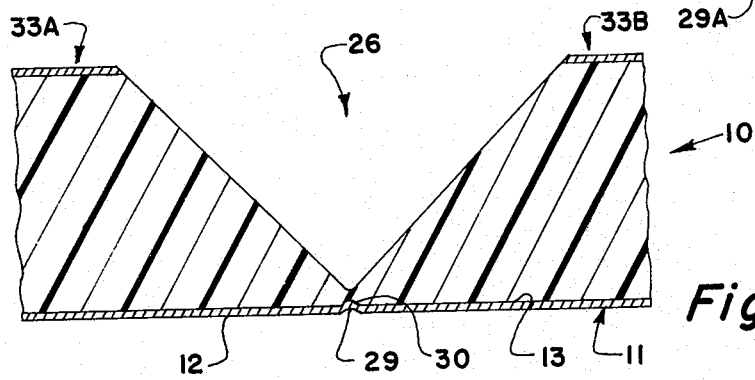
FIG. 4 is a fragmentary cross-sectional view, similar to FIG. 3, illustrating the result of the indenting step illustrated in FIG. 3.

After notching, the facing sheet 11 is transversely indented in the region beneath the apex 27 to produce a groove 29 in the exposed face 12 and a complementing bead 30 in the hidden face 13, see FIG. 4. The preferred configuration of the groove 29 and the complementing bead 30 will be hereinafter described in greater detail. The indenting may be accomplished by spaced-apart linear dies 31, 32 (FIG. 3) presenting a forming bead 29A and a complementing forming groove 30A, respectively. Either or both of the linear dies 31, 32 may be power-actuated.

It will be observed in FIG. 3 that the apex 27 of the V-notch is spaced from the hidden face 13 by a distance indicated at 41. It is preferred that the distance 41 be not less than one-eighth inch. With the V-notch 26 thus arranged, the panel 10 may be bent, by hand, to produce an outside corner, such as illustrated in FIG. 5, which does not require the addition of supplemental insulation.

Reverting of FIG. 4, it will be observed that the V-notch 26 divides the panel 10 into contiguous panel segments 33A, 33B, one on each side of the groove 29. After notching, the panel 10 is bent, by hand, to produce the outside corner 34 (FIG. 8), wherein the contiguous panel segments 33A, 33B are angularly presented and have a common bending edge 34. It will be observed when comprising FIGS. 4 and 5 that the inside of the common bending edge 34 is formed from the complementing bead 30 and that the outside of the common bending edge 34 is formed from the groove 29. The groove 29 which is visible in the unbent panel 10 of FIG. 4 is not visually discernible as a concavity in the outside corner 34 of FIG. 5.

LONGITUDINAL BENDS

The present method may also be employed to prepare a panel for bending about a selected line which extends longitudinally of the panel. Apparatus 36 for performing the notching and indenting steps of the present method is schematically illustrated in FIG. 9. The apparatus 36 includes a notching zone 37 and an indenting zone 38. The notching zone 37 includes two drive circular saws 39, a stripper 40, and a router 41. The indenting zone 38 includes a pair of forming rolls 42. The saws 39, stripper 40, router 41 and the forming rolls 42 may be supported on a common frame 43 in vertically spaced relation relative to a pair of jig bars 44. The jig bars 44 guide the panels during their passage through the notching and indenting zones 37, 38, respectively.

In the apparatus 33, the common frame 43 may be fixed whereas the jig bars 44 may be adjustably supported for movement transversely of the frame 43. Alternatively, the jig bars 44 may be fixed whereas the common frame 43 may be adjustably supported for movement transversely of the jig bars 44. The relative transverse movement between the jig bars 44 and the frame 43 provides a means by which the selected line, along which the notching and indenting are performed, may be accurately located at various positions between the opposite longitudinal sides of a panel.

In operation, the panel 10 (FIG. 7) is guided through the apparatus 36 along a rectilinear path of travel indicated by the arrow 45. The circular saws 39 are positioned to sever the central web 17 of the inner facing sheet 15 along spaced-apart cut lines 46 parallel with the selected line 22 to produce a liner sheet segment 47. The stripper 40 has a stripping end 48 positioned to remove the now severed liner sheet segment 47 from the foam core 16. The router 41 (FIGS. 7 and 8) presents oppositely extending blades 49 which scoop out a portion of the foam core 16 between the cut lines 46, thereby to produce the V-notch 26 (FIG. 8).

The forming roll set 42 (FIGS. 7 and 9) comprises a lower roll 50 and an upper roll 51. The lower and upper rolls 50, 51 present, respectively, a forming bead 29B and a complementing forming groove 30B. The indenting step is accomplished by guiding the panel 10 along the rectilinear path of travel 45, between the lower and upper rolls 50, 51. As best shown in FIG. 9, the forming bead 29B engages the exposed face 12 whereas the complementing forming groove 30B engages the core 16 at the apex of the V-notch 26. The bead and groove 29B, 30B form the groove 29 and the complementing bead 30 in the facing sheet 11, see FIG. 10.

It will be observed in FIG. 10 that the V-notch 26 divides the panel 10 into contiguous panel segments 33A, 33B, one on each side of the groove 29. After notching has been completed, the panel 10 may be bent, by hand, to produce the outside corner 34 illustrated in FIG. 8, wherein the contiguous panel segments 33A, 33B are angularly presented and have a common bending edge 34. It will be observed when comparing FIGS. 5 and 10 that the inside of the common bending edge 34 is formed from the complementing bead 30 and that the outside of the common bending edge 34 is formed from the groove 29. The groove 29 which is visible in the unbent panel 10 of FIG. 10 is not visually discernible as a concavity in the outside corner 34 of FIG. 5.

Figure 11:
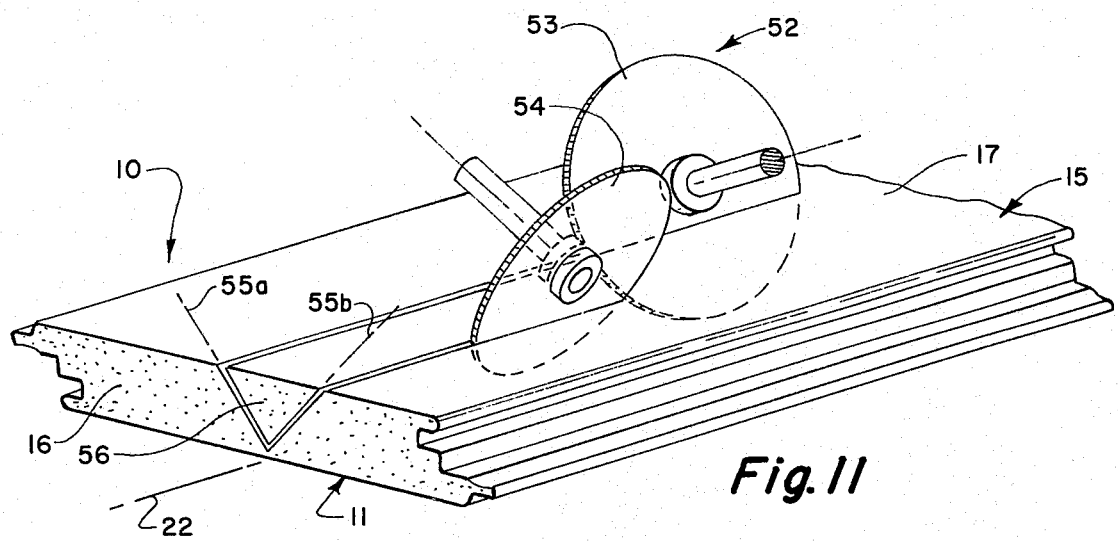
FIG. 11 is a fragmentary isometric view illustrating alternative notching arrangement.
Figure 12:
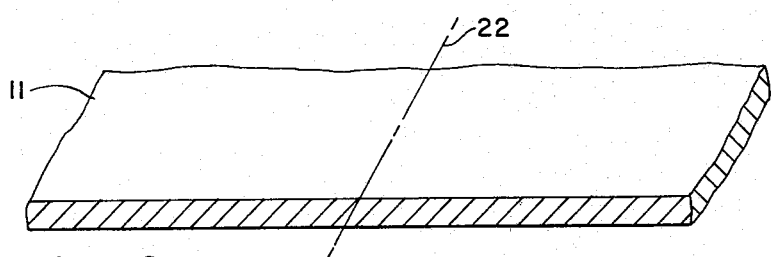
FIGS. 12 through 14, inclusive, are isometric views of a fragment of a metal facing sheet, illustrating certain principles of the indenting step and the bending step of the present method.

FIG. 11 illustrates alternative notching means 52 for notching the panel 10 along the selected line 22. In this embodiment, the notching means 52 comprises two circular saws 53, 54 which are angularly presented, for example at an angle of 45°, relative to the facing sheet 11. The saws 53, 54 are arranged to sever the central web 17 of the facing sheet 15 and the foam core 16 along first and second cutting planes 55a, 55b which intersect proximate to the facing sheet 11, thereby to remove a V-shaped segment 56. The notched panel 10 is then indented along the selected line 22 by passing the panel between the forming rolls 50, 51 (FIG. 9) to produce a panel such as illustrated in FIG. 10.

BEAD AND GROOVE CONFIGURATION

FIGS. 11 to 14 illustrate the steps by which the metal facing sheet 11 is bent about the selected line 22. The metal facing sheet 11 may have a thickness in the range of 16 to 30 gauge, and may comprise materials such as steel, metal coated steel, stainless steel, weathering steel, aluminized steel, aluminum and the like.

In accordance with the present invention, the metal facing sheet 11 is indented (FIG. 13) along the selected line 22 to produce the groove 29 in the exposed face 12 and the complementing bead 30 in the opposite or hidden face 13. Thereafter, the indented metal facing sheet 11 is bent about the selected line 22 (FIG. 14) to provide angularly presented sheet portions 57, 58 having a common bending edge 34. The indented metal facing sheet 11 is bent such that the inside arc 59 (FIG. 14) of the common bending edge 34 is formed from the bead 30, and the outside arc 60 of the common bending edge 34 is formed from the groove 29. The arrangement is such that the originally presented groove 29 is substantially imperceptible visually as a concavity after the metal sheet 11 has been bent as illustrated in FIG. 14.

Figure 13:
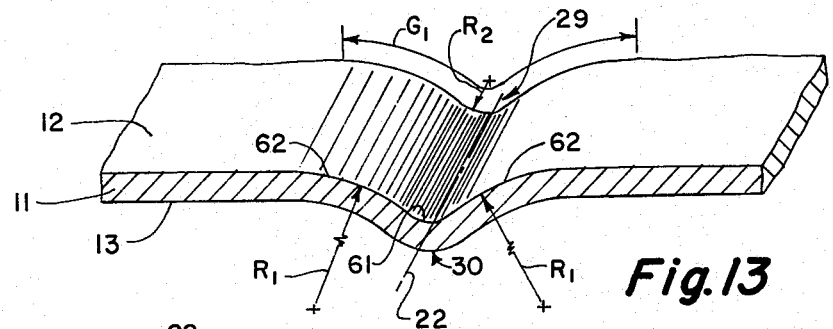
Figure 14:
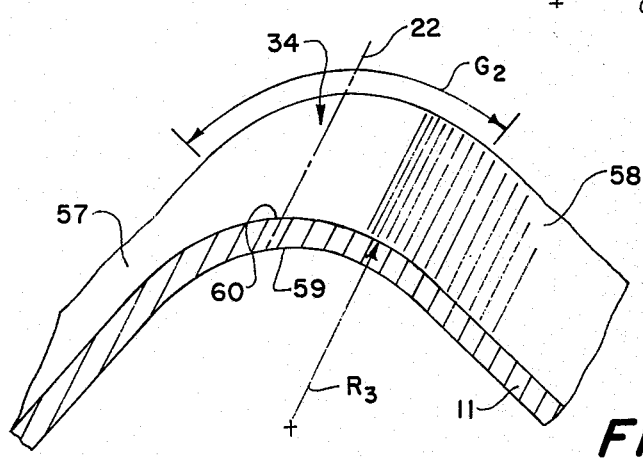

It will be observed in FIG. 13 that the surface of the groove 29 consists of a central concave arc segment 61 of radius $R_2$ and convex arc segments 62 of radius $R_1$, each providing a smooth transition between one edge of the concave arc segment 61 and the exposed face 12 of the metal facing sheet 11. The convex arc segments 62 preferably are formed with a radius $R_1$ which is substantially equal to the radius $R_3$ (FIG. 14) of the common bending edge 34.

It will also be observed in FIG. 13 that the groove 29 has a girth indicated at $G_1$ which is the sum of the peripheral lengths of the two convex arc segments 62 and the concave arc segment 61. The common bending edge 34 (FIG. 14) has a girth indicated at $G_2$. In accordance with the present invention, the girth $G_1$ of the groove 29 is undisturbed during bending of the metal facing sheet 11 and is substantially equal to the girth $G_2$ of the common bending edge 34 (FIG. 14).

SUMMARY

It should be readily apparent from the foregoing description that the method of this invention provides numerous advantages over the prior art methods. The present method facilitates the preparation of building panels in the factory for bending in the field. The present method also simplifies the manufacturing procedure in that the building panels are mass produced and thereafter individual panels are notched and indented in the manner described. Inasmuch as the notching and indenting of the panel occur after the panel has been assembled, the present method also provides a means by which the notch and indentation may be precisely located in each of a plurality of building panels. The present method may be employed to bend panels about transversely extending as well as longitudinally extending selected lines.

I claim:

1. A method of bending a building panel along a selected line, comprising
   providing a metal facing sheet having an exposed face and a hidden face;
   applying a backing to substantially the entire area of said hidden face;
   notching said backing to provide a V-notch extending parallel with said selected line and having an apex proximate to said hidden face; and then
   indenting said facing sheet segment along said selected line to produce a groove in said exposed face and a complementing bead in said hidden face; and
   bending said building panel about said selected line to provide angularly presented panel segments having a common bending edge and such that the inside of said common bending edge is formed from said complementing bead and the outside of said common bending edge is formed from said groove, said groove which is visible prior to bending said panel being substantially imperceptible visually as a concavity after bending said panel.

2. The method of claim 1 wherein said backing comprises a foamed plastics composition.

3. The method of claim 1 wherein said facing sheet is indented by:
   placing said panel between spaced-apart linear die members presenting a forming bead extending parallel with said selected line and confronting said exposed face, and a complementing forming groove parallel with and confronting said apex; and
   forcibly moving said die members toward one another, thereby to form said groove and said complementing bead in said facing sheet.

4. The method of claim 1 wherein said facing sheet is indented by:

passing said panel between forming rolls presenting a peripheral forming bead engaging said exposed face and a peripheral complementing forming groove engaging said backing at said apex.

5. The method of claim 1 wherein said backing is notched by:
cutting said backing along first and second cutting planes which intersect proximate to said hidden face.

6. The method of claim 1 wherein said backing comprises
a core of foamed plastic composition having one face secured to said hidden face of said facing sheet and an opposite face; and
a liner sheet substantially coextensive with said opposite face of said core of formed plastic composition.

7. The method of claim 6 wherein said panel is notched by:
severing said liner sheet along spaced-apart cut lines parallel with said selected line;
removing that segment of said linear sheet between said cut lines to expose said core; and
removing a portion of said core between said cut lines to provide said V-notch.

8. The method of claim 7 wherein said portion of said core is removed by routing.

9. A method of bending a building panel along a selected line which extends longitudinally of said panel, comprising
providing a metal facing sheet having an exposed face and a hidden face;
applying a backing to substantially the entire area of said hidden face, said backing comprising a liner sheet and a foam core disposed between said facing sheet and said liner sheet;
notching said backing to provide a V-notch having an apex parallel with said selected line and proximate to said hidden face;
passing said panel between forming rolls presenting a peripheral forming bead engaging said exposed face and a complementing peripheral forming groove engaging said core at said apex, to indent said facing sheet along said selected line and thereby to produce a groove in said exposed face and a complementing bead in said hidden face; and
bending said building panel about said selected line to provide angularly presented panel segments having a common bending edge and such that the inside of said common bending edges formed from said complementing bead and the outside of said common bending edge is formed from said groove, said groove which is visible prior to bending said panel beng substantially imperceptible visually as a concavity after bending said panel.

10. The method of claim 9 wherein said panel is notched by:
severing said liner sheet along spaced-apart cut lines parallel with said selected line;
removing that segment of said linear sheet between said cut lines to expose said core; and
removing a portion of said core between said cut lines to provide said V-notch.

11. The method of claim 10 wherein said portion of said core is removed by routing.

* * * * *